United States Patent
Ohgaki et al.

(10) Patent No.: US 8,241,731 B2
(45) Date of Patent: *Aug. 14, 2012

(54) DISPLAY PANEL, METHOD OF MANUFACTURING A DISPLAY PANEL, AND DISPLAY UNIT

(75) Inventors: Masaru Ohgaki, Kanagawa (JP); Masahiro Masuzawa, Chiba (JP); Toshihiro Kanematsu, Kanagawa (JP); Shinji Aoki, Kanagawa (JP); Shinya Seno, Kanagawa (JP); Hisayoshi Ohshima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 987 days.

This patent is subject to a terminal disclaimer.

(21) Appl. No.: 12/043,777

(22) Filed: Mar. 6, 2008

(65) Prior Publication Data

US 2008/0220204 A1 Sep. 11, 2008

(30) Foreign Application Priority Data

Mar. 8, 2007 (JP) .................. 2007-059118

(51) Int. Cl.
*B32B 3/00* (2006.01)
*B32B 1/00* (2006.01)
*B32B 3/12* (2006.01)
*G09G 3/34* (2006.01)
*G02B 26/00* (2006.01)

(52) U.S. Cl. ........ 428/166; 428/178; 428/116; 359/290; 359/296; 345/107

(58) Field of Classification Search .......... 428/166, 428/178, 188, 1.1, 1.5, 72, 73, 116, 117; 349/73, 74, 123; 359/290, 296, 242, 253, 359/254, 245, 247, 237, 238; 345/107, 105; 204/450, 600

See application file for complete search history.

(56) References Cited

U.S. PATENT DOCUMENTS

| | | | |
|---|---|---|---|
| 6,898,014 B2 | 5/2005 | Ohgaki | |
| 6,974,549 B2 | 12/2005 | Ohgaki | |
| 7,182,830 B2* | 2/2007 | Liang et al. | 156/292 |
| 7,936,498 B2* | 5/2011 | Kanematsu et al. | 359/296 |
| 2002/0008898 A1 | 1/2002 | Katase | |
| 2002/0188053 A1* | 12/2002 | Zang et al. | 524/474 |
| 2004/0196527 A1* | 10/2004 | Liang et al. | 359/296 |
| 2006/0097361 A1 | 5/2006 | Tanaka et al. | |
| 2006/0203179 A1* | 9/2006 | Kawase | 349/187 |
| 2007/0242560 A1 | 10/2007 | Norikane et al. | |

FOREIGN PATENT DOCUMENTS

| | | |
|---|---|---|
| EP | 1582329 A1 | 10/2005 |
| JP | 2000-352728 | 12/2000 |
| JP | 2001-315217 | 11/2001 |

(Continued)

OTHER PUBLICATIONS

Jul. 1, 2008 search report in connection with a counterpart European patent application No. 08 25 0776.

(Continued)

*Primary Examiner* — Catherine A Simone
(74) *Attorney, Agent, or Firm* — Cooper & Dunham LLP

(57) ABSTRACT

A display panel includes a sheet having first and second spaced apart surfaces defining a space therebetween and a plurality of partitions extending from the first surface to the second surface and dividing the space into a plurality of cells, wherein the thickness of each partition is in a range of 0.01 to 10 μm.

17 Claims, 12 Drawing Sheets

FOREIGN PATENT DOCUMENTS

| | | |
|---|---|---|
| JP | 2001-343672 | 12/2001 |
| JP | 2004-189487 | 7/2004 |
| JP | 3680996 | 5/2005 |
| JP | 2005-148680 | 6/2005 |
| JP | 2005-189444 | 7/2005 |
| JP | 2007-47541 | 2/2007 |
| JP | 2007-98930 | 4/2007 |
| WO | WO 2004/089434 | 10/2004 |
| WO | WO 2006/090579 A1 | 8/2006 |

OTHER PUBLICATIONS

May 8, 2012 Japanese official action in connection with corresponding Japanese patent application.

* cited by examiner

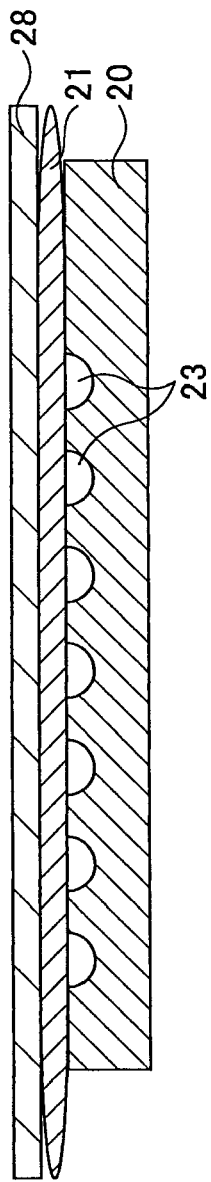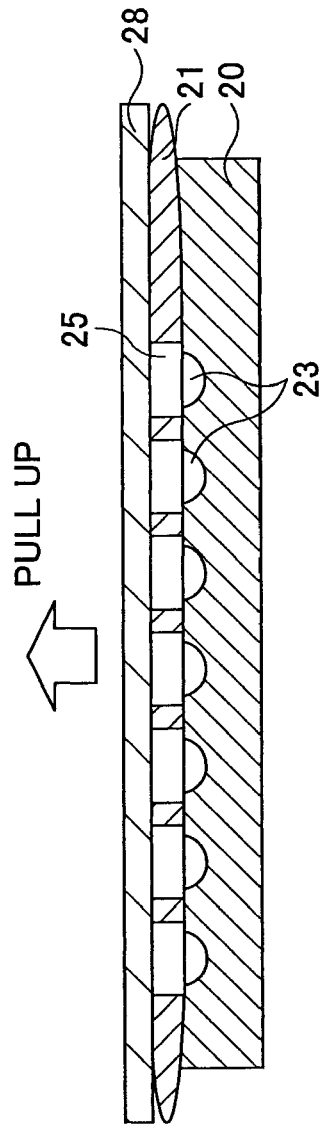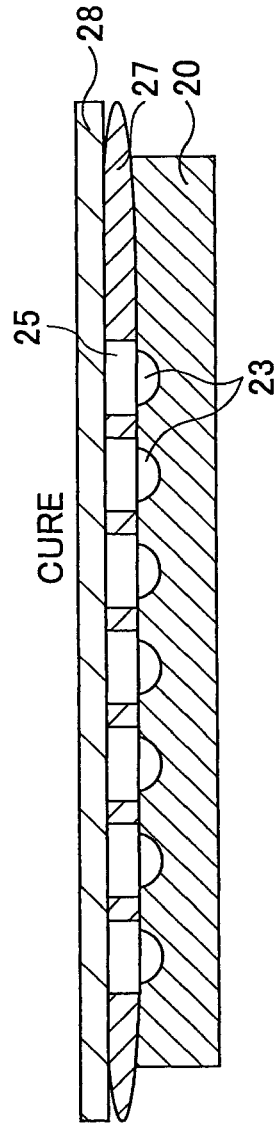

FORMATION OF HONEYCOMB

FILM TRANSCRIPTION

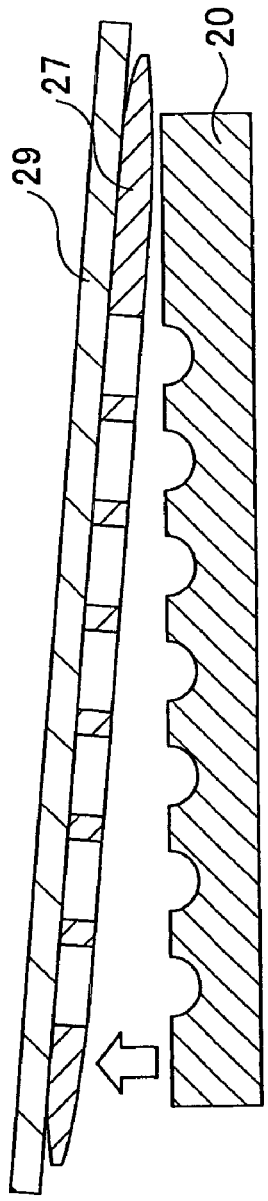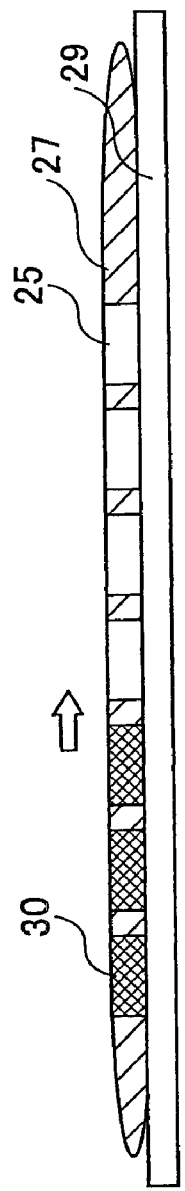
FIG.7D  SEPARATION OF HONEYCOMB
FIG.7E  MATERIAL INFUSION

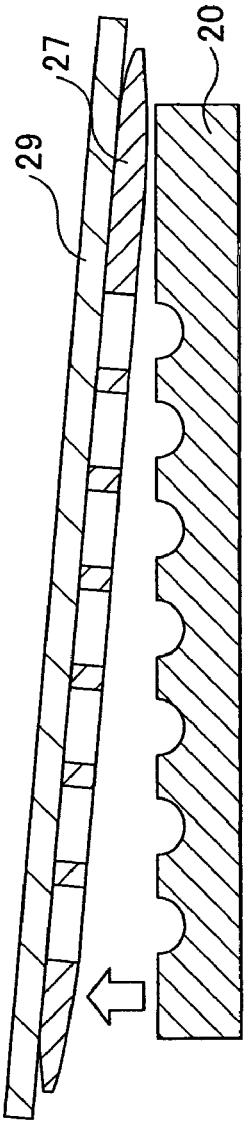
FIG.12A SEPARATION OF HONEYCOMB
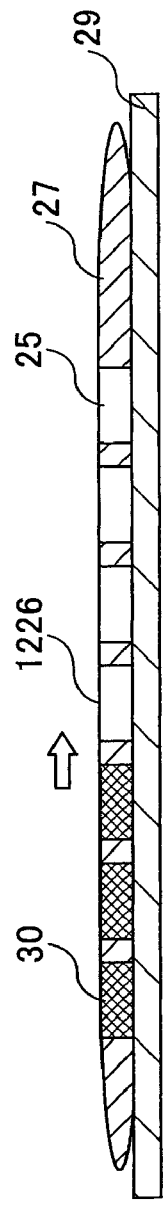
FIG.12B MATERIAL INFUSION
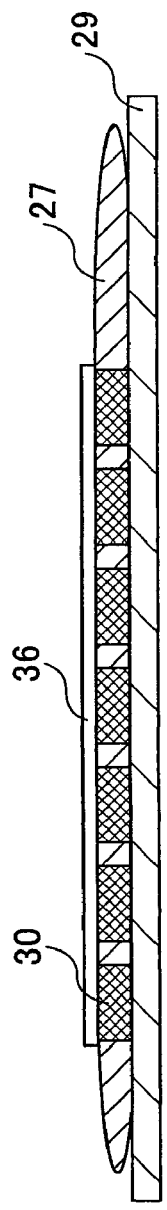
FIG.12C SEALING

DISPLAY PANEL, METHOD OF MANUFACTURING A DISPLAY PANEL, AND DISPLAY UNIT

BACKGROUND

1. Technical Field

This disclosure relates to a display panel, a method for manufacturing a honeycomb-structured sheet suitable for manufacturing a display panel, a method for manufacturing a display panel, a display unit, and an electronic equipment for image display.

2. Description of the Related Art

As a display terminal for displaying images such as letters, still frames, and moving pictures, a CRT or a liquid crystal display is widely used. Even though such display terminal can display digital data instantly and the data is changeable, it is not easy to carry this unit around. Moreover, the self-luminous device gives rise to disadvantages of causing eye fatigue when it is used for a long time and being unable to maintain the display when the power is off. When the letters or still frames are distributed or saved as documents, they are recorded on a paper medium by a printer or the like. This paper medium is widely used as a so-called hard copy. Since the reflection caused by multiple scattering is seen in a hard copy, it has a better visibility than the self-luminous device and does not cause eye fatigue. In addition, it is so light to handle that the data can be read in any position. However, a hard copy is discarded after its use. Although a part of it is recycled, there are problems for this recycling from the aspect of resource saving such as requiring infinite labor and cost. On the other hand, with the development of information technology equipment, information processing such as making documents is performed by use of a computer, and opportunity to read the documents with a display terminal is increased greatly.

In these circumstances, the needs of the paper-like display medium with advantages of both display and hard copy have been increasing. Preferably, the display can show the changeable data, has a print function, and does not cause eye fatigue. A display medium using, for example, a polymer dispersed liquid crystal, bistable cholesteric liquid crystal, electrochromic device, and electrophoretic device has been recently noted as a display medium which is reflective, yields a bright display, and has a memory function. Especially, a display using an electrophoretic device is superior in a display quality and consumption energy of the display during an operation. A theoretical basis is disclosed in Patent Document 1, for example.

In a representative display medium of the electrophoretic system, a display panel encloses the colored dispersions in which electrophoretic particles with a different color are dispersed. Such display panel is functionalized by being placed between a pair of transparent electrodes which apply a voltage to the panel. The surface of the electrophoretic particles is charged in the dispersion medium. When the voltage which attracts a charge of the particles is applied to one electrode, the particles start to be attracted to and accumulated at the electrode so that a color of the particles is observed. When the voltage which repels a charge of the particles is applied to one electrode, the particles start to be attracted to another electrode so that a color of the particles is observed. This change in color is utilized for the display.

An electrophoretic display device using such display medium of the electrophoretic system is one of the image display devices. For an image display unit, it is required to have an assembly of many electrophoretic devices arranged in an imperceptible space. Therefore, a frame is required to arrange these devices. A sheet with a honeycomb structure which is an assembly of multiple concaves is known as a preferable frame for an image display device to arrange such fine devices separately at high density. Each honeycomb is considered as a picture element with the electrophoretic particles and dispersion medium being arranged inside, and these honeycombs are considered as an image display unit as a whole.

For example, an electrophoretic display and manufacturing methods thereof are disclosed in Patent Document 2. This electrophoretic display has many cup-like concaves formed by a microembossing process or an image exposure, and a solvent and charged colored particles dispersed in the solvent are filled in each concave. An overcoat of the sealing compositions, which has a smaller specific gravity than, and is nonmiscible with, the dispersions, is formed by being cured and encloses the dispersions inside the concaves.

In the microembossing process, a thermoset precursor layer made of thermal plastic is coated on a conductor film and embossed by a mold which already has a pattern in advance. Then, the precursor layer is cured by radiation, cooling, solvent evaporation, or other means and taken out from the mold. In this method, the mold should have very thin concaves (between convexes) to obtain the honeycomb with thin walls.

In the image exposure, a conductor film coated with a radiation curable layer is image exposed. After the exposed region becomes cured, the non-exposed region is removed. In this method, a pattern is printed on the radiation curable layer by radiation through a mask or directly by narrowed radiation.

For a method for manufacturing a honeycomb structure, a manufacturing method of adhesive inhibitor, which is composed of a biodegradable film having a honeycomb structure and described in Patent Document 3, is disclosed. This honeycomb structure is formed by a biodegradable polymer and a phosphate-based surface active agent, and the effect of the surface active agent gives the structure the function of preventing an adhesion of the structure to an organism. A thickness of the membrane of this honeycomb structure is about 13 µm.

[Patent Document 1] Japanese Patent Application Publication No. 2004-189487

[Patent Document 2] Japanese Patent No. 3680996

[Patent Document 3] International Publication 2004/148680

When a structure for image display (hereinafter also referred to as a honeycomb-structured sheet) is applied as a display panel for an image display unit such as an electrophoretic display, it is preferred that a cell of a honeycomb-structured sheet has the large opening ratio, that is, a thin partition, to obtain a display image with a high reflectance and a high contrast. Also, for a display panel of an image display unit, it is preferred to have the same thickness of the partition of the cell which becomes a form of each display device.

In the honeycomb-structured sheet which is manufactured by a microembossing process as defined in Patent Document 2, it is difficult to produce a concave structure with thin partitions. A concave (between convexes) of the mold has to be very narrow to obtain a thin partition. As a result, since the precursor layer is not fully entered in the concave, the mold form cannot be accurately transcribed. Moreover, since the strength of a precursor is not enough, a part of the precursor stays in the concave when it is taken out from the mold. Furthermore, since a thermoplastic resin which requires a cooling time for cure is used, it gives a problem to have a long cycle time. A thickness of the partition which separates each cell of the honeycomb-structured sheet is not particularly described, but given the processes of transcribing and separating from the mold, there is a limit of the aspect ratio or thickness of the partition. For example, according to the consideration made by the inventors, in the microembossing process transcribing a mold form, preferably for a display panel of image display, it appears difficult to make a microembossed structure in which its partitions have a thickness of less than 10 µm and its height is more than 50 µm.

In a honeycomb-structured sheet manufactured by an image exposure process, a pattern is printed on a radiation curable layer by radiation through a mask or directly by narrowed radiation. However, it is difficult to make a wall surface with a high aspect ratio due to wraparound or scattering of synchrotron radiation in the radiation curable layer. Moreover, a method using photolithography requires more processes, increasing the cost, so it is unsuitable especially for making a honeycomb-structured sheet with a large area.

SUMMARY

In an aspect of this disclosure, there are provided a display panel with a high reflectance and a good contrast, a manufacturing method thereof, manufacturing method of a honeycomb-structured sheet for the display panel, a display unit using the display panel, and an electronic equipment for image display comprising the display unit.

In another aspect, a display panel includes a sheet including first and second spaced apart surfaces defining a space therebetween and a plurality of partitions extending from the first surface to the second surface and dividing the space into a plurality of cells, wherein the thickness of each partition is in a range of 0.01 to 10 µm.

In an embodiment, the first surface forms a plurality of first walls corresponding to the respective cells, the first walls each having a thickness in a range of 0.01 to 10 µm.

In an embodiment, the partitions and the first walls form intersecting areas having a curved surface of 0.1 to 50 µm in a curvature radius.

In an embodiment, the partitions between said cells are made of a water soluble resin or a resin cured by ultraviolet irradiation.

In an embodiment, the first walls are made of a resin of which a thickness is in a range of 0.1 to 10 µm.

In an embodiment, the first and second surfaces are formed of a resin which has a thickness in a range of 0.1 to 10 µm.

In another aspect of this disclosure, there is provided a method for manufacturing a honeycomb-structured sheet comprising the steps of:

covering a substrate surface having multiple concaves arranged in a predetermined interval with a deformable covering material such that the concaves remain below the covering material;

expanding air in said concaves to form cells corresponding to said concaves in the covering material, the thus deformed covering material and cells forming a honeycomb-structured sheet;

curing said honeycomb-structured sheet;

separating said cured honeycomb-structured sheet from the substrate surface; and adjusting the size of the openings of the cells of the separated honeycomb-structured sheet.

In an embodiment, the method includes a step of, during or after said adjusting step, removing a portion of the honeycomb-structured sheet to obtain openings in the honeycomb-structured sheet at opposite sides of a cell.

In an embodiment, the adjusting step and/or forming step of the opening include a step of dissolving a part of the honeycomb-structured sheet with a solvent which can dissolve the cured honeycomb-structured sheet.

In an embodiment, the method further includes the steps of applying a volatile material which does not dissolve the sheet on a surface of said cured honeycomb-structured sheet and condensing gas of the solvent which can dissolve the sheet with evaporating said volatile material.

In an embodiment, the deformable covering material is a resin which is dissolved in water and can be cured by drying or an ultraviolet curable resin which can be cured by ultraviolet irradiation.

In an embodiment, a sheet including said cells is a sheet having a honeycomb-structure made by said manufacturing method for the honeycomb-structured sheet.

In another aspect of this disclosure, there is provided a method for manufacturing a display panel includes the steps of providing a honeycomb-structured sheet having a plurality of cells arranged in a plane and including a first surface having a plurality of openings corresponding to the respective cells, and a plurality of partitions dividing the cells, the partitions each having a thickness in a range of 0.01 to 10 micrometers, infusing dispersions into each cell via the openings, and sealing with a resin the openings of the cells in which the dispersions are infused.

In an embodiment, a thickness of the first surface is in a range of 0.01 to 10 µm.

In an embodiment, the partitions and the first surface form intersecting areas having a curved surface of 0.1 to 50 µm in a curvature radius.

In an embodiment, the partitions between said cells are made of a water soluble resin or a resin cured by an ultraviolet irradiation.

In an embodiment, the first surface is made of a resin of which a thickness is in a range of 0.1 to 10 µm.

According to another aspect, a display unit includes the display panel and electrodes that apply a voltage to the first and second surfaces of said display panel.

In an embodiment, at least one of said electrodes is a transparent electrode.

In another aspect, electronic equipment for image display includes the display unit, wherein the electronic equipment includes one of an electronic paper, an electronic book, an electronic notebook, an electronic schedule display, an electronic advertising display board, a mimic board, and an electronic map display.

The aforementioned and other aspects and various features may be provided in a display panel with a high reflectance and a good contrast, manufacturing method thereof, a manufacturing method of a honeycomb-structured sheet for the display panel, a display unit using the display panel, and an electronic equipment comprising the display unit.

BRIEF DESCRIPTION OF THE DRAWINGS

FIGS. 5A through 5C are drawings describing a method for manufacturing a honeycomb structure according to a first embodiment;

FIGS. 7A through 7E are drawings describing a method for manufacturing a display panel;

FIGS. 12A through 12C are drawings describing a method for manufacturing a display panel with a sealing material.

DESCRIPTION OF THE PREFERRED EMBODIMENTS

Figure 1:
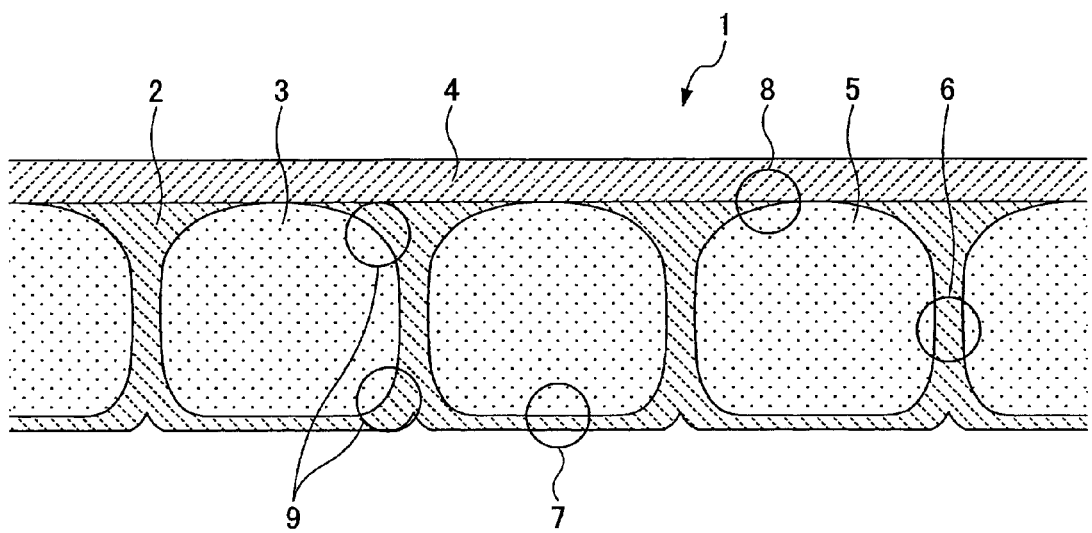
FIG. 1 is a sectional view of a display panel according to an aspect of the invention.

A display panel 1 according to an aspect of the invention includes a sheet formed with cells enclosing dispersions 5 in which at least one type of white or colored particles is dispersed, and a thickness of a partition between the cells is in a range of 0.01 to 10 μm and preferably 0.05 to 5 μm. A sectional view of the display panel 1 according to an aspect of the invention is shown in FIG. 1. The display panel 1 includes a honeycomb-structured sheet 2 in which multiple cells 3 are arranged along a sheet surface and where dispersions 5 with particles having a display function are enclosed in each cell 3. One side of the honeycomb-structured sheet 2 is covered with a sealing resin 4 which seals each cell 3. A partition 6 is between the cells of the honeycomb-structured sheet 2 and has a thickness of 0.01 to 10 μm and preferably 0.05 to 5 μm. The partition, as shown in FIG. 1, separates each cell.

Figure 2:
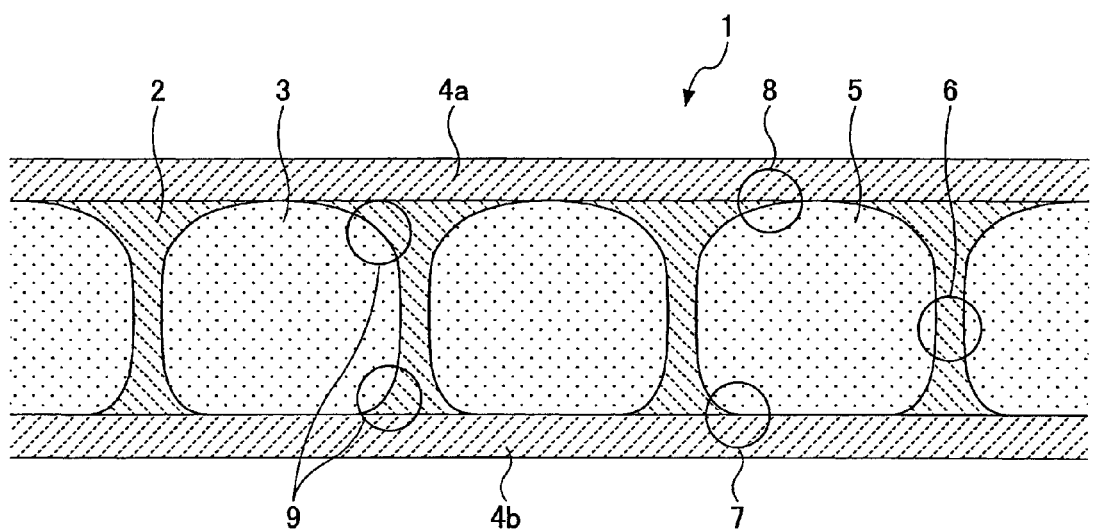
FIG. 2 is a sectional view of another display panel according to an aspect of the invention.

Although a sectional view of a display panel is shown in FIG. 1 and FIG. 2, it is preferred that an arrangement of the cells of the honeycomb-structured sheet when viewed from above and below, for example, is seen with the cells of the same size and the same form in tetragonal lattice or hexagonal closest-packed. However, a display panel of the invention is not limited to these arrangements, and may include an arrangement in which the size and form of the cells are non-uniform.

In FIG. 2, another display panel 1 according to an aspect of the invention is shown. The display panel 1 includes a honeycomb-structured sheet 2 having multiple cells 3, where a partition 7, 8 (hereinafter referred to as an upper or lower wall) from the cell 3 to the sheet surface on both sides of the cells 3 has an opening, and both openings are sealed with a film of a sealing resin 4a and 4b. A partition 6 is between the cells 3 and has a thickness of 0.01 to 10 μm and preferably 0.05 to 5 μm.

By setting a thickness of the partition 6 as less than 10 μm and preferably less than 5 μm, a ratio of the cell 3, which functions as a display device, to the partition 6 between the cells 3, which partition 6 typically has no display function, becomes larger. As the ratio of cell 3 to partition 6 becomes large, a display quality improves such as a reflectance or a contrast when the display panel 1 is used in a display unit. Also, by setting a thickness of the partition 6 between the cells 3 of the honeycomb-structured sheet 2 as more than 0.01 μm and preferably more than 0.05 μm, the strength of the cell, and consequently the strength of the display panel, can be sufficiently maintained. Furthermore, in manufacturing the honeycomb-structured sheet 2, the sheet 2 is easily made when a thickness of the partitions 6 between the cells 3 is uniform.

In a display panel 1, a thickness of upper and lower walls is preferably in the range of 0.01 to 10 μm and more preferably 0.05 to 5 μm. A thickness of walls is illustrated by a partition 7 and a partition 8 on the opening side in FIG. 1, and partitions 7 and 8 on both opening sides in FIG. 2. In these cases, a thickness of the sealing resin 4, 4a, and 4b is not included as a part of the thickness of the partition 7 or 8.

Since partitions 7 and 8, which extend from a cell of a honeycomb-structured sheet 2 to a sheet surface, become transmitting surfaces for light and intermediate layers for the electrodes during application of a voltage when the sheet is used in a display unit, they are preferably set as thin as possible. By setting a thickness of the partitions 7 and 8 as less than 10 μm and preferably less than 5 μm, a display quality improves such as a reflectance or a contrast when the display panel 1 is used in a display unit. Furthermore, a display unit of which display function is sufficiently performed only by applying a low voltage can be made. Also, by setting a thickness of the partitions 7 and 8 of the honeycomb-structured sheet 2 at more than 0.01 μm and preferably more than 0.05 μm, the strength of the cell 3, and consequently the strength of the display panel 1, can be sufficiently maintained. Furthermore, in manufacturing the honeycomb-structured sheet 2, the sheet with uniform partitions 7 and 8 is easily made.

Conventional honeycomb-structured sheets have been manufactured by a microembossing process or image exposure. In the microembossing process, a cell structure is formed by pressing a mold onto a film to transcribe a mold form. In this process, it is difficult to make partitions between the cells and on the bottom which are the side walls for the concave with a thickness of less than 10 μm because a minimum thickness of the film for this process is about 100 μm and the film forms the concave which serves as the cell structure. In the image exposure process, a resist layer is formed on the film, and a concave is further made in the resist layer. Therefore, a thickness of the partitions between the concave cells and on the bottom is a thickness of the film. Since it is difficult to manufacture or handle a film of which a thickness is less than 10 μm, it is difficult to make the bottom of the concave with a thickness of less than 10 μm. According to one aspect of the present invention, a honeycomb-structured sheet 2 with such thin partitions can be made by a manufacturing method described later.

In the display panel 1, a partition 6 between cells 3 and a partition 7 or 8 which is between a cell and a sheet surface form an intersecting area 9 having a curved surface preferably having a curvature radius in a range of 0.1 to 50 μm. In the display panels 1 shown in FIG. 1 and FIG. 2, for example, each cell 3 is shaped similar to a cuboid (substantially a rectangle in sectional view in FIGS. 1 and 2).

When the display panel 1 comprising such cells 3 is used as an electrophoretic display panel or the like, the strength of the display panel 1 is increased. Especially, even if the display panel 1 is used with a bending stress, it is provided with sufficient strength. For a honeycomb-structured sheet 2, the strength can be increased by making thick the intersecting area 9 of two partitions. Although a curvature radius in the intersecting area 9 may be set at 0.1 to 50 μm, it is preferably set at 1 to 10 μm. An intersecting area 9 with a curvature radius of less than 1 μm gives a display panel the strength to be slightly wound, but the strength is not enough to roll the display panel. When the curvature radius is more than 10 μm, the display quality, especially the reflectance, may be negatively affected.

In a display panel according to one aspect of the invention, partitions 6 between cells, that is, the honeycomb-structured sheet 2 are preferably made of a water soluble resin or a resin cured by an ultraviolet irradiation. There are polyurethane, gelatin, polyvinyl alcohol, and the like for a water soluble resin while there are alkoxy acrylate, epoxy acrylate, and the like for a ultraviolet curing resin. These resins are made of resin materials suitable for a manufacturing method of a honeycomb-structured sheet of the invention described later.

In FIG. 1, openings of the cells are sealed with a sealing resin layer 4, of which a thickness is preferably in the range 0.1 to 10 μm. In FIG. 2, openings of the cells on both sides are sealed with sealing resin layers 4a and 4b, of which a thickness is both preferably in the range 0.1 to 10 μm.

Since sealing resin layers 4, 4a, and 4b for cells of a honeycomb-structured sheet 2 become transmitting surfaces for light and intermediate layers for the electrodes during application of a voltage when the sheet is used in a display unit, they are preferably set as thin as possible. By setting a thickness of the sealing resin layers 4, 4a and 4b as less than 10 μm and preferable less than 5 μm, a display quality improves such as a reflectance or a contrast when a display panel 1 is used in a display unit. Furthermore, a display unit of which display function is sufficiently performed only by applying a low voltage can be made. Also, by setting a thickness of the sealing resin layers 4, 4a, and 4b at more than 0.01 μm and preferably more than 0.05 μm, the strength of the cells, and consequently the strength of the display panel, can be sufficiently maintained. Furthermore, in manufacturing a display panel 1, the sealing resin layers 4, 4a, and 4b with uniform thickness are easily made.

Figure 3:
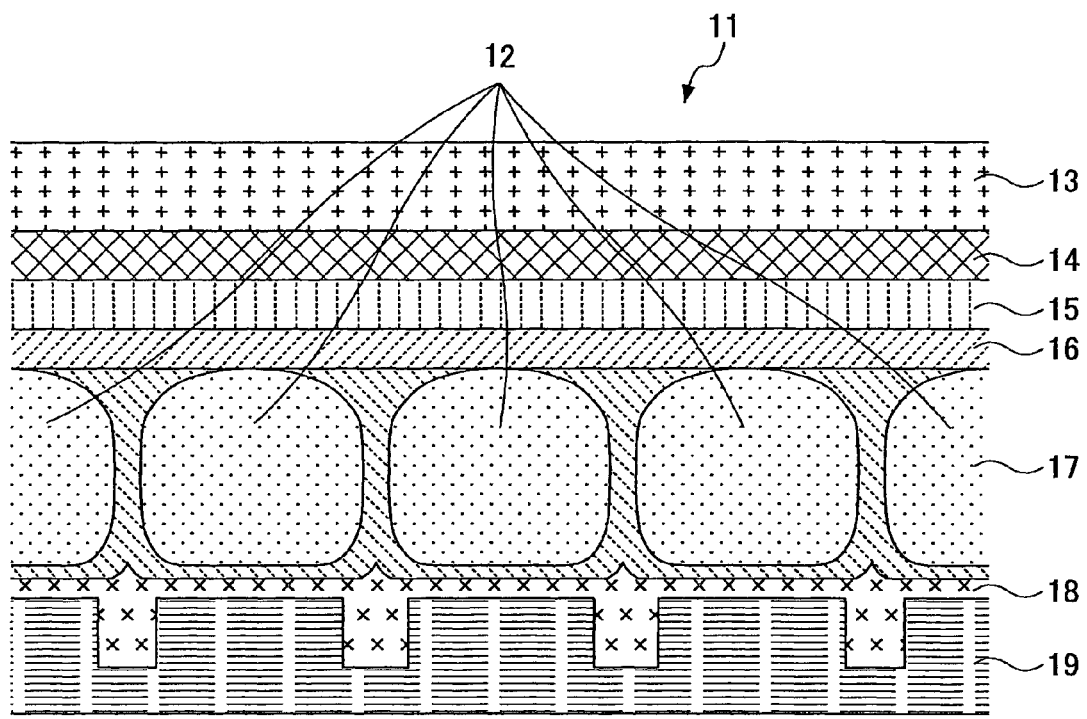
FIG. 3 is a sectional view of a display unit according to an aspect of the invention.

FIG. 3 illustrates a sectional view of a display unit 11 according to an aspect of the invention. In this display unit 11, the display panel 1 shown in FIG. 1 is used. In FIG. 3, the display unit 11 includes a protective coat 13 such as a PET resin layer, a transparent electrode layer 14 such as an ITO electrode, an adhesive layer 15, a sealing layer 16, a honeycomb-structured sheet 17 enclosing dispersions in a cell 12, an electrode 19, and an adhesive layer 18 bonding a honeycomb-structured sheet 17 and the electrode 19. The dispersions in the cell 12 are a combination of blue nonpolar solvents for dispersion of, for example, white electrophoretic particles. The sealing layer 16 and the honeycomb-structured sheet 12 enclosing dispersions in the cell 12 may be, for example, the display panel shown in FIG. 1, which has already been described. When a display panel such as shown in FIG. 1 is used, a sealing layer is placed between the honeycomb-structured sheet 17 and the adhesive layer 18. In a display unit with this form, opaque materials such as aluminium foil, silver foil, gold foil, and copper foil may be utilized for the electrode 19. Transparent materials may be used for the protective coat 13, transparent electrode layer 14, adhesive layer 15, and sealing layer 16. These layers transmit light when used in a display unit.

In the display unit 11, by applying a voltage between a transparent electrode layer 14 and an electrode 19, electrophoretic particles (e.g. white particles) in a dispersion medium (e.g. blue) in each cell are attracted to the transparent electrode layer 14 (upper side of the cell 12) or the electrode 19 (lower side of the cell 12), resulting in a white or blue color observed at the side of a transparent electrode 14 (upper side). In this case, by regulating the applied voltage to the transparent electrode layer 14 and the electrode at the cells 12 individually, the color observed in each cell can be controlled. A display panel according to an embodiment of the invention may be used in the display unit 11, so that the display unit is superior in display quality such as a light reflectance or a contrast.

An electronic equipment for image display incorporating a display unit of the present invention can be manufactured, which is, for example, specific image display unit such as an electronic paper, an electronic book, an electronic notebook, an electronic organizer, an electronic schedule display, an electronic advertising display board, a mimic board, and an electronic map display as well as a conventional image display unit and display.

Figure 4A:
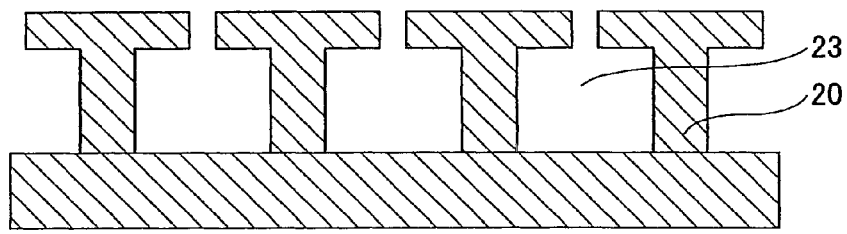
FIGS. 4A through 4D are schematic diagrams showing formation of a honeycomb structure and describing a method for manufacturing the honeycomb structure.

Now, a method for manufacturing a honeycomb-structured sheet in accordance with an aspect of the invention will be described. FIG. 4 illustrates an exemplary manufacturing method of a honeycomb-structured sheet. FIG. 4A is a sectional view of a substrate 20 for manufacturing a honeycomb-structured sheet. This substrate 20 comprises multiple hollows, that is concave 23, each having an opening 24 on the surface. Even though an opening 24 of the concave 23 in the substrate 20 is narrow, it is favorable for adhering a material which forms a honeycomb-structured sheet thereto.

In FIG. 4, the concaves 23 are arranged in a hexagonal closest-packing configuration, but they may be arranged in a tetragonal lattice. In addition, the substrate 20 may be formed of a rigid inorganic substance such as metal, glass, or ceramics, or an organic substance such as a resin which is not deformed when a material for a honeycomb-structured sheet is deformed, or composites thereof. By way of example, the substrate material may include nickel, silicon, glass with a resist pattern thereon, a copper-clad sheet (copper/polyimide multilayer substrate), glass, and other resins (polyimide, PTE, acryl and the like). A specific example includes electrodeposited Ni, glass with a resist pattern thereon, a copper-clad sheet (copper/polyimide multilayer substrate), an etched glass, and silicon.

Figure 4B:
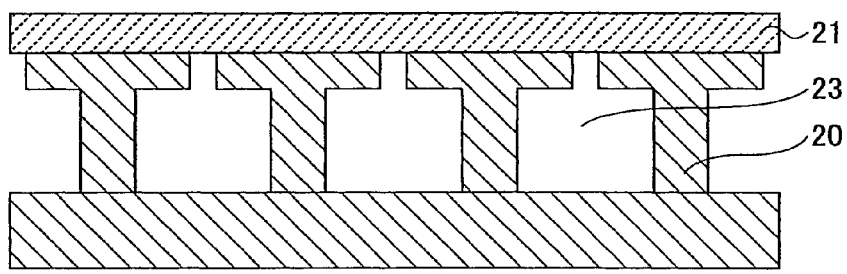
Figure 4C:
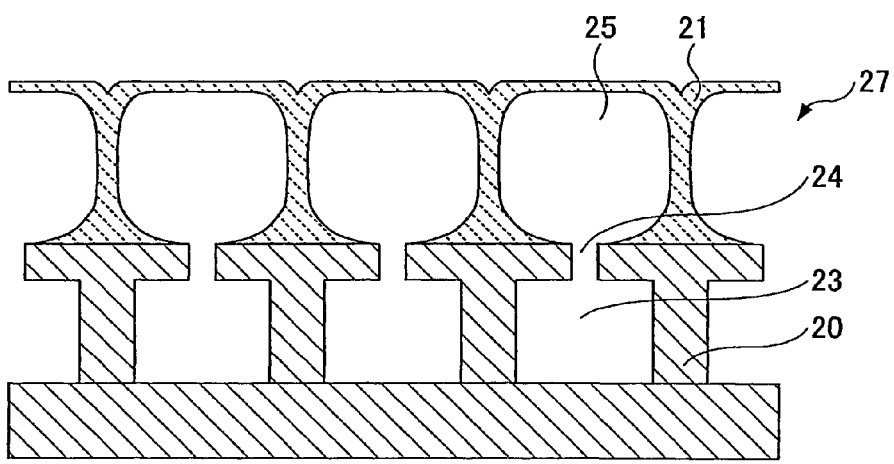

FIG. 4B is a sectional view showing the substrate surface covered with a deformable resin 21. When such substrate 20 covered with a layer of deformable resin 21 is introduced in a vacuum chamber and exposed to a decompression condition, air in the concaves 23 expands. Since the concaves 23 are now sealed with the deformable resin 21, as shown in FIG. 4C, the layer of the deformable resin 21 is deformed with the expansion of air, resulting in multiple hollows in the resin 21. By adjusting a degree of decompression in the vacuum chamber, the hollows form cells 25 with partitions therebetween on the surface of the substrate 20, and thereby form the honeycomb-structured sheet 27. A depth of each cell 25 of the honeycomb-structured sheet 27 is also determined by the decompressing vacuum. That is, a high vacuum results in a large amount of expanding air in the concaves, thereby increasing the depth of each cell 25. A low vacuum results in a small amount of expanding air, thereby decreasing the depth of each cell 25. Because a high vacuum causes a high expansion, an upper wall of a deformable resin 21 becomes thin and an opening is formed ultimately on the ceiling. Thus, a honeycomb-structured sheet 27 with openings on one surface or a honeycomb-structured sheet 27 with openings on both surfaces is formed.

Figure 4D:
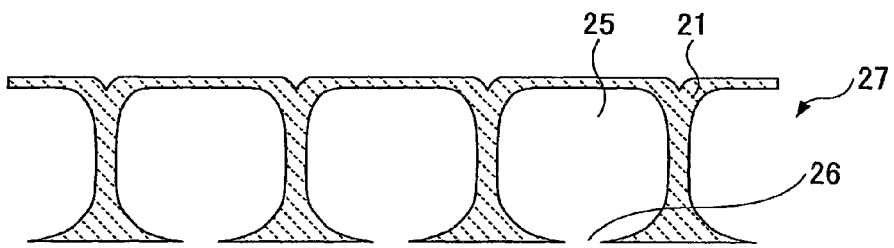

Finally, as shown in FIG. 4D, by curing a honeycomb-structured sheet 27, which is a resin deformed by pressure from the concaves of the substrate 20, and then separating the sheet 27 from the substrate 20, a honeycomb-structured sheet 27 can be obtained. If the concaves 23 are arranged in a tetragonal lattice on the substrate 20, the honeycomb-structured sheet 27 has cells 25 arranged in a tetragonal lattice. If the concaves 23 are arranged in hexagonal closest-packing, the honeycomb-structured sheet 27 has cells arranged in hexagonal closest-packing. When a resin material, for example, gelatin or polyurethane resin, is used which can be cured by drying, the deformed resin may be cured by drying the honeycomb-structured sheet 27. On the other hand, when a honeycomb-structured sheet 27 is made using a resin material which can be cured by an ultraviolet irradiation, the deformed resin may be cured by irradiating an ultraviolet to the honeycomb-structured sheet 27.

In the method for manufacturing these honeycomb-structured sheets, the deformable material may include polyvinyl alcohol, polyvinyl pyrrolidone, polyurethane, pullulan, albumin, CMC, polyacrylic acid, cellulose, starch, gelatin, alginate, guar gum, gum arabic, carrageenan, tragacanth, pectin, dextrin, casein, collagen, polyvinyl methyl ether, carboxyvinyl polymer, sodium polyacrylate, polyethylene glycol, ethylene oxide, agar, locust bean gum, xanthan gum, cyclodextrin, tannic acid, gum karaya, gellan gum, furcellaran, tragacanth gum, lecitin, chitin chitosan, sodium chondroitin sulfate, lignin sulfonic acid, methylcellulose, hydroxylmethylcellulose, polyacrylamide, polyethyleneimine, dimethylaminoethylacrylate, dimethylaminoethylmethacrylate, polyethylene oxide, polyarylamine, urethane acrylic UV curable resin, epoxy acrylic UV curable resin, or alkoxy acrylic UV curable resin. Specifically, for example, polyurethane may include HYDRAN WLS-201 (produced by Dainippon Ink and Chemicals Inc.) and a water soluble resin. For gelatin, MC-243 (produced by Jellice Co., Ltd.) can be used by dissolving the gelatin in water at about 5-30 wt %. For polyvinyl alcohol, POVAL PVA117 (produced by Kuraray Co., Ltd) can be used by dissolving the polyvinyl alcohol at, for example, about 5-30 wt %.

In a form of a honeycomb-structured sheet as shown in FIG. 4C, the thickness of the partitions and walls around a cell 25 is determined by the surface tension of the deformable resin. Therefore, it is possible to obtain a thin partition and a thin wall compared to the microembossing process or image exposure process. Furthermore, it is easy to make a form where an opening is narrow and a form where an intersecting area of a partition and a wall containing an opening or an opposite wall has a curvature radius.

In addition, a thickness or a curvature radius of each part forming each cell of a display panel may be controlled by the thickness of the deformable resin placed on the substrate, a decompression condition (air pressure) when a honeycomb-structured sheet is formed, and a material of the deformable resin. The thinner the deformable resin placed on the substrate is, the thinner the parts and the smaller the curvature radius of the cells can be obtained. The lower the decompressing pressure is, the thinner the partition of the parts and the smaller the curvature radius can be obtained. The smaller the viscosity of the material of the deformable resin is, the thinner the parts and the smaller the curvature radius can be obtained. Moreover, there is an optimum value for a volume of the concave and a distance between the concaves formed on the substrate, so a desired honeycomb-structured sheet can be made by changing the material of the deformable resin or adjusting a degree of the decompression.

A method for manufacturing a honeycomb-structured sheet will be described with some embodiments.

First Embodiment

A method for manufacturing a honeycomb-structured sheet according to a first embodiment is illustrated in FIG. 5. FIG. 5A is a sectional view showing that on a rigid substrate 20 providing multiple minute concaves 23, a deformable resin 21 is applied, which is a material for a honeycomb-structured sheet and can be cured by an ultraviolet, and a pressing plate 28 which transmits an ultraviolet is further adhered on the resin 21. In this case, the substrate 20 is firmly adhered to the deformable resin 21, and the deformable resin 21 is firmly adhered to the pressing plate 28.

Then, as shown in FIG. 5B, the pressing plate 28 is pulled up from the substrate 20. Even though the substrate 20 and the deformable resin 21 and the deformable resin 21 and the pressing plate are not be separated since they are each firmly adhered together, air left in the concaves 23 on the surface of the substrate 20 expands to form respective cells 25 in the deformable resin 21. These cells form a cell structure with corresponding individually to the concaves 23 while a whole sheet of the deformable resin 21 forms a honeycomb-structured sheet.

Since the inside of the cells 25 is still decompressing, an ultraviolet is irradiated from above the pressing plate 28 to ultraviolet cure the deformable resin 21 as shown in FIG. 5C. A honeycomb-structured sheet is completed by detaching the sheet from the pressing plate 28 and the substrate 20.

Second Embodiment

Figure 6A:
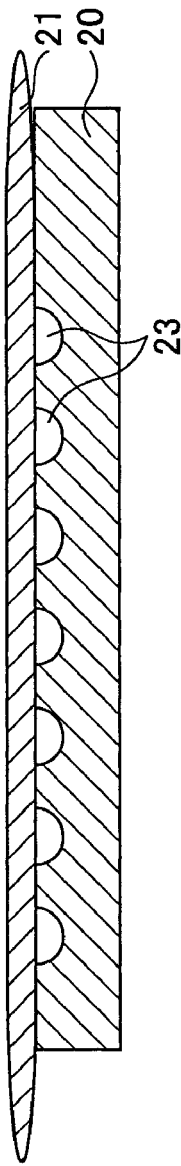
FIGS. 6A through 6C are drawings describing a method for manufacturing a honeycomb structure according to a second embodiment.

A method for manufacturing a honeycomb-structured sheet according to a second embodiment is illustrated in FIG. 6. In FIG. 6A, on a rigid substrate 20 providing multiple minute concaves 23, a deformable resin 21 is applied, which is a material for a honeycomb-structured sheet and can be cured by drying. In this case, the substrate 20 is firmly adhered to the transformable resin 21.

Figure 6B:
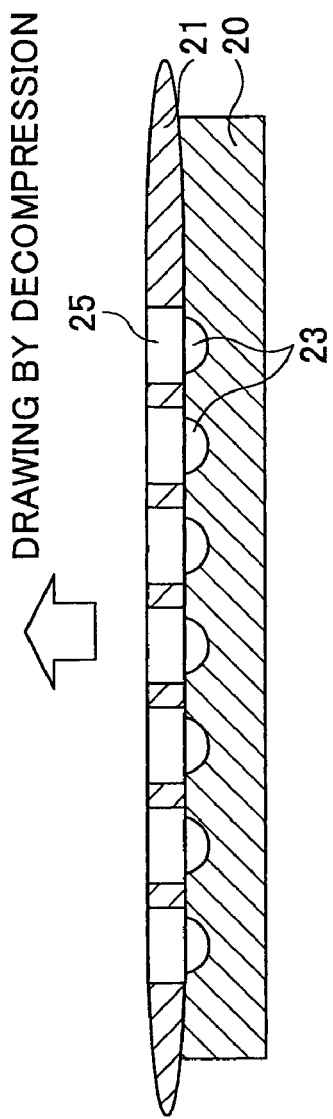

Then, as shown in FIG. 6B, the substrate 20 and the deformable resin 21 are introduced into a decompression environment. Even though the substrate 20 and the deformable resin 21 are not separated since they are firmly adhered together, air left in the concaves 23 on the surface of the substrate 20 expands to form respective cells 25 in the deformable resin 21. These cells form a cell structure with corresponding individually to the concaves 23 while a whole sheet of the deformable resin 21 forms a honeycomb-structured sheet.

Figure 6C:
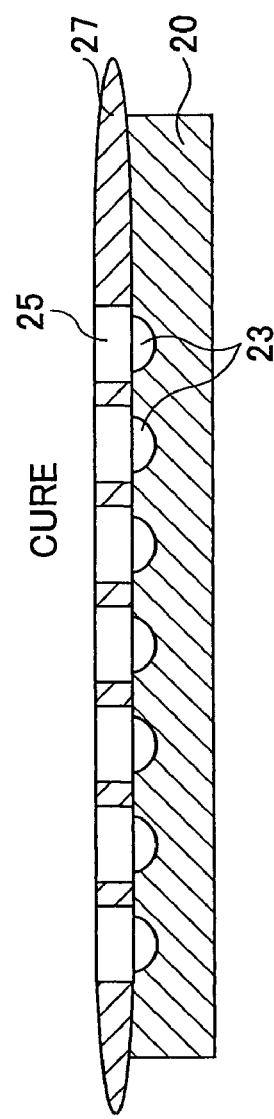

Since the inside of the cells 25 is still decompressing, dry air flow is introduced to cure the deformable resin 21 as shown in FIG. 6C with the inside being decompressing or the same decompressed condition. A honeycomb-structured sheet is completed by setting a pressure back to a normal value and detaching the sheet from the substrate 20.

Figure 7A:
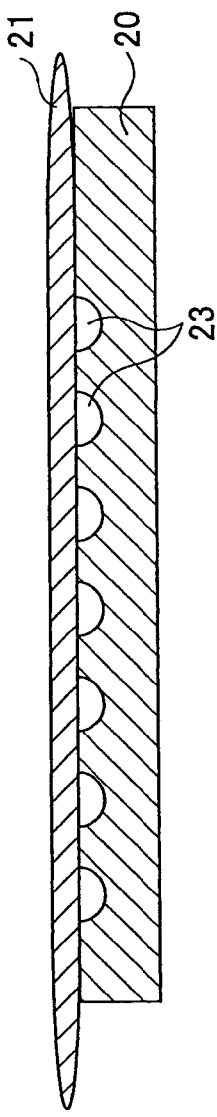

Next, a method for manufacturing a display panel according to an aspect of the invention will be described. A honeycomb-structured sheet is used in the display panel, which is obtained by, for example, one of the above described methods for manufacturing a honeycomb-structured sheet. An exemplary method for manufacturing a display panel is illustrated in FIG. 7. In FIG. 7A, on a rigid substrate 20 providing multiple minute concaves 23, a deformable resin 21 is applied, which is a material for a honeycomb-structured sheet and can be cured by drying. In this case, an aqueous gelatin solution is used as the deformable resin 21. The substrate 20 is firmly adhered to the deformable resin 21.

Figure 7B:
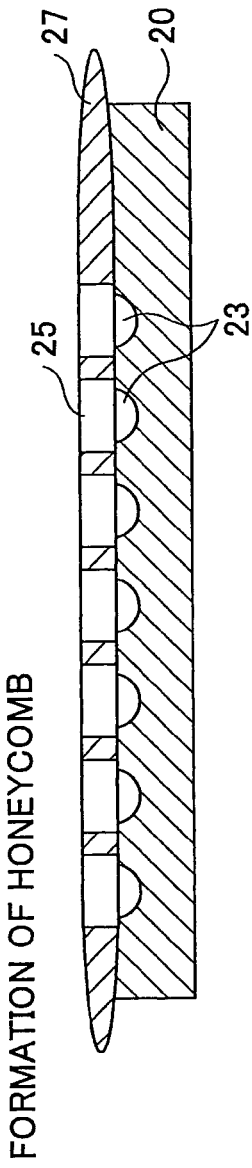

Then, as shown in FIG. 7B, the substrate 20 and the deformable resin 21 are introduced into a decompression environment. Even though the substrate 20 and the deformable resin 21 are not be separated since they are firmly adhered together, air left in the concaves 23 on the surface of the substrate 20 expands to form cells 25 in the deformable resin 21. These cells form a cell structure with corresponding individually to the concaves 23 while a whole sheet of the deformable resin 21 forms a honeycomb-structured sheet.

Since the inside of the cell 25 is still decompressing, dry air flow is introduced to cure the deformable resin 21 with the inside being decompressing or the same decompressed condition. In this case, FIG. 7B shows the cell 25 of which the top is opened, but the top of the cell 25 may or may not be opened.

Figure 7C:
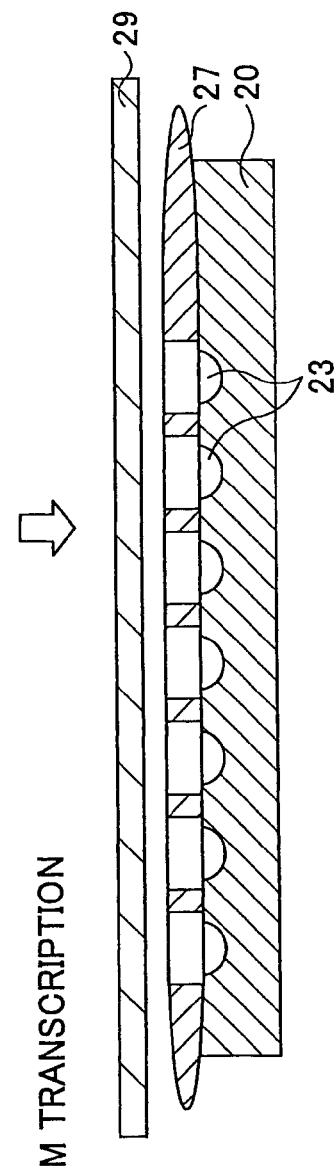

Then, as shown in FIG. 7C, a release sheet 29, which is made of resin and used as a sealing material, is adhered to the surface of the honeycomb-structured sheet 27 still attached to the substrate 20. As shown in FIG. 7D, from the substrate 20, the honeycomb-structured sheet 27 is separated with the release sheet 29.

As shown in FIG. 7E, the honeycomb-structured sheet 27 separated with the release sheet 29 is turned upside down so that the side with openings which was adhered to the substrate 20 faces upward. A display material such as electrophoretic dispersions 30 for display is infused in each cell 25, and the opening is sealed with a resin film. A sectional view of sealing with a sealing material 36 is illustrated in FIG. 12C.

Figure 8:
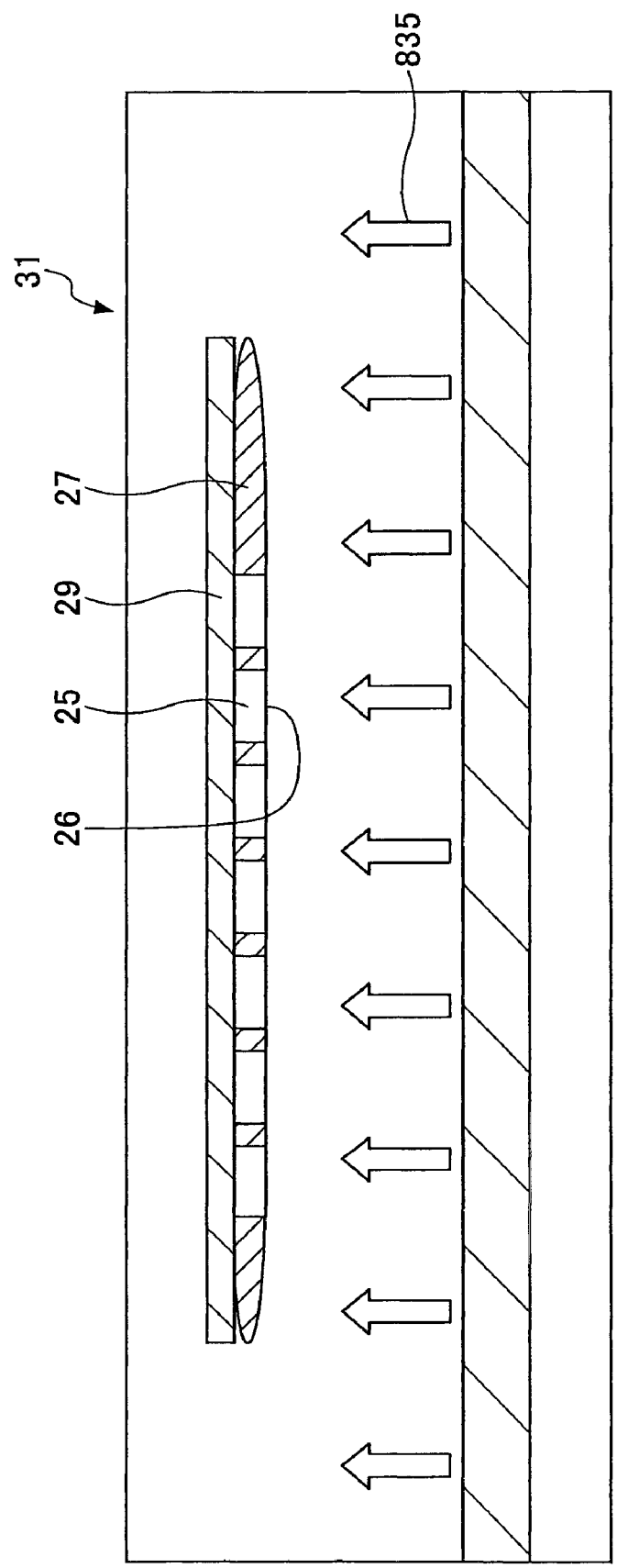
FIG. 8 is a drawing describing a method for forming openings of cells.

In the honeycomb-structured sheet 27 separated from the substrate 20, the opening may not be fully opened depending on the manufacturing condition including a property of the substrate 20 or the deformable resin 21. In such case, the dispersions 30 can not be fully infused or a display quality including a reflectance or a contrast of the produced display panel will be lowered. Therefore, a procedure for adjusting a size of the opening of the cell will be described. FIG. 8 is a schematic diagram showing a procedure for adjusting a size of the opening of the cell.

Figure 9A:
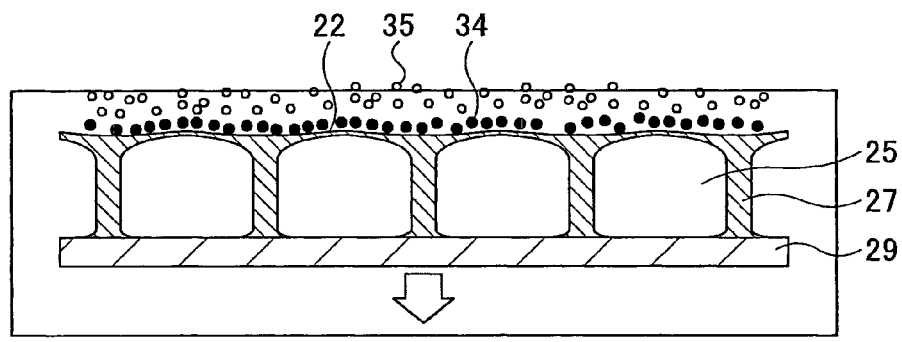
FIGS. 9A and 9B are schematic diagrams of formation of openings of cells.
Figure 9B:
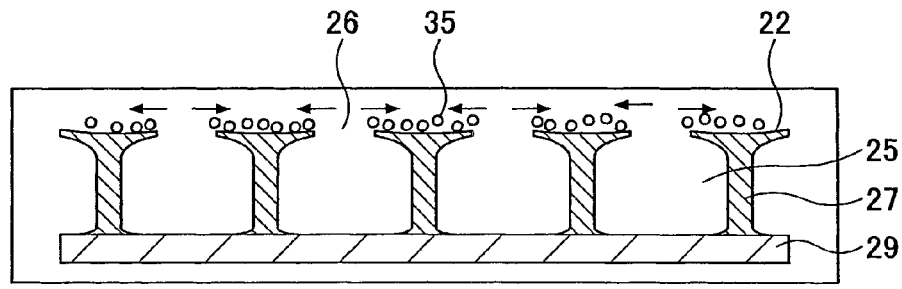

In FIG. 8, the honeycomb-structured sheet 27 separated with the release sheet 29 as shown in FIG. 7D is introduced into an opening adjuster vessel 31 which is operated in a sealed condition, and then the opening 26 of the cell 25 is exposed to solvent vapor 835 which can dissolve a resin forming the honeycomb-structured sheet 27. Since a gelatin is used as a resin forming the honeycomb-structured sheet 27, it may be exposed to water vapor. The openings 26 of the cells 25 of the honeycomb-structured sheet 27 are preferably set to a temperature at which the water vapor is condensed because the solvent can generally dissolve the resin in a liquid state. As illustrated in FIG. 9, the solvent vapor 35 is condensed to change into liquid on a surface 22 and dissolves parts of the surface 22. FIG. 9A is a sectional view that a volatile material 34, which does not dissolve the resin, is applied on a surface 22 of the honeycomb-structured sheet 27 and the honeycomb-structured sheet 27 is then placed in a vaporous atmosphere of a solvent 35 which dissolves the resin. In FIG. 9B, the volatile material 34 is vaporized from the sheet surface 22, and vapor of the solvent 35 is condensed on the sheet surface 22. Then, the condensed solvent 35 dissolves a thinner part of the partition on the sheet surface 22, becomes saturated, and then aggregates at the partition between the cells. Thus, the opening 26 of the cell 25 on the sheet surface 22 can be formed if not already done so by the FIGS. 7A-7B process steps or enlarged as desired.

Figure 10A:
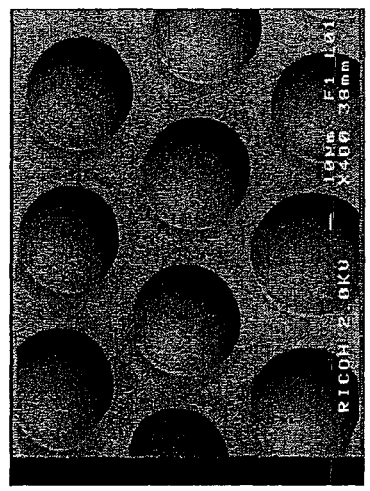
FIGS. 10A through 10C are pictures showing a size of openings (A) right after a honeycomb-structured sheet is formed, (B) 20 seconds after the exposure to solvent vapor, and (C) 40 seconds after the exposure to the solvent vapor.
Figure 10B:
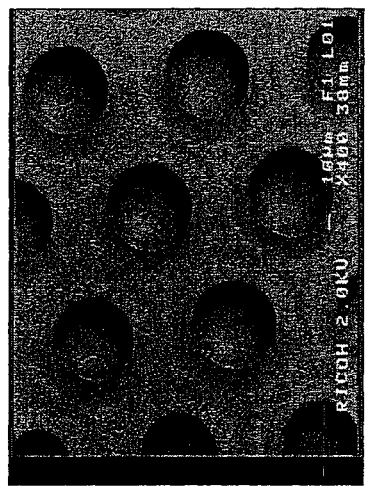
Figure 10C:
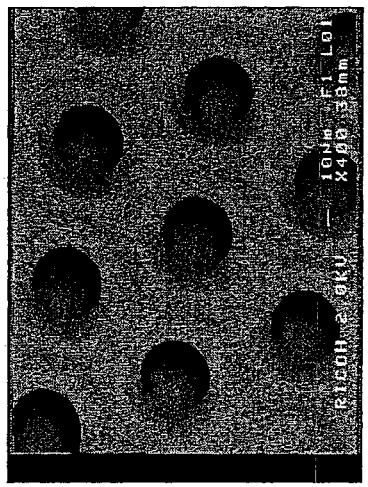

FIG. 10 shows the pictures illustrating that the opening of the cell of the honeycomb-structured sheet formed with gelatin is actually enlarged by the exposure to vapor. In accordance with the passage of time the opening is exposed to vapor, a size of the opening is enlarged from 40 μm to 80 μm in 40 seconds.

Figure 11:
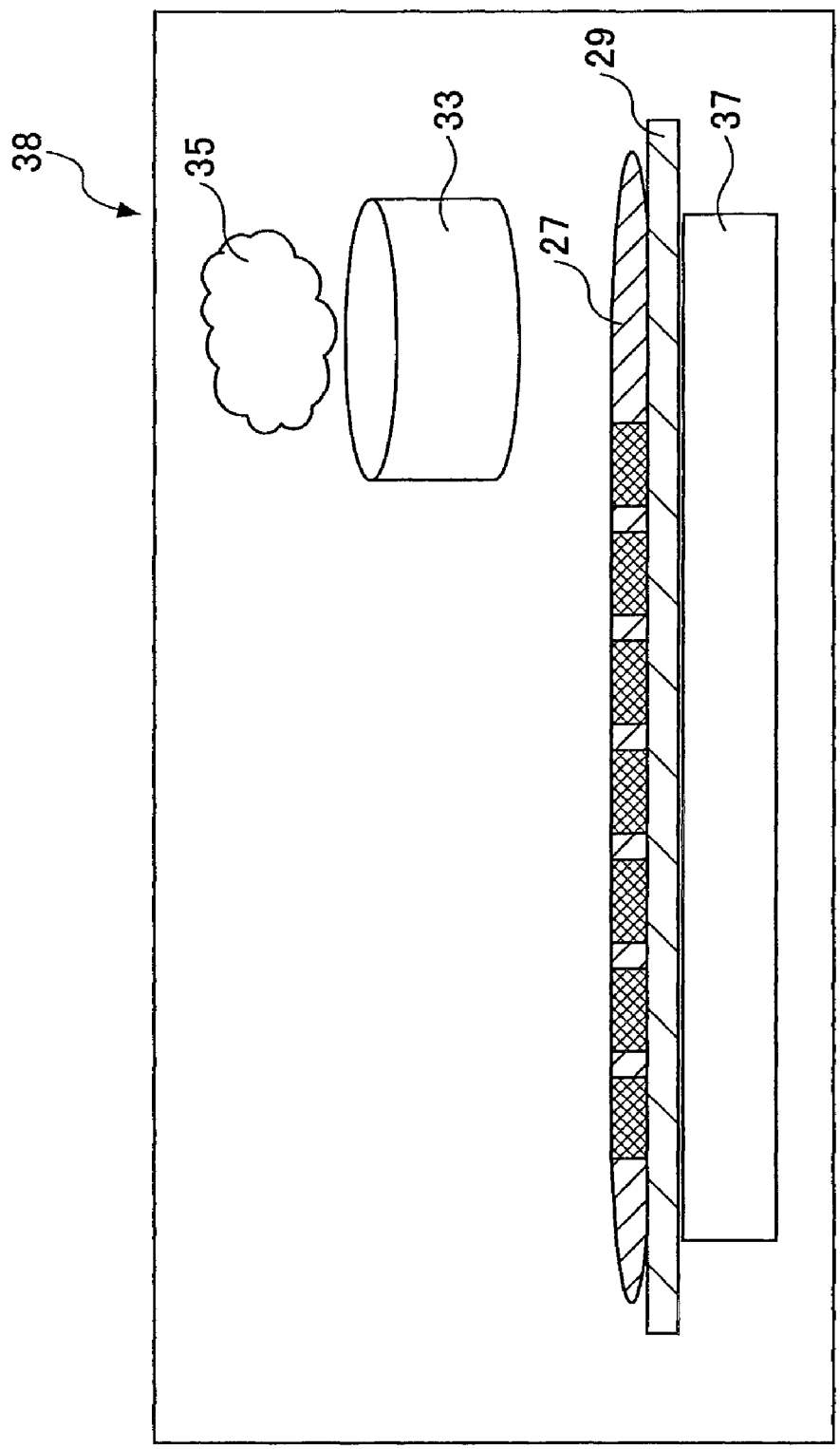
FIG. 11 is a drawing showing an example of formation of openings of cells.

FIG. 11 is a schematic illustration of an embodiment of an opening adjusting unit 38 for forming and/or enlarging openings of the sheet 27. Solvent vapor 35 generated from a solvent heater 33 is condensed on the surface of the honeycomb-structured sheet 27 to open the thin partition or enlarge the opening of the honeycomb-structured sheet 27. Temperature of the honeycomb-structured sheet 27 is regulated by a temperature control unit 37 so that the solvent vapor 35 is reasonably condensed on the sheet 27.

In the following, specific examples will be described.

Example 1

Manufacture of a Honeycomb-Structured Sheet I

Polyurethane which is a water soluble resin was used as a deformable covering material. For polyurethane, HYDRAN WLS-201 (produced by Dainippon Ink and Chemicals, Inc.) was used. A polyurethane layer was formed on the substrate 20 as shown in FIG. 6A, for example, using a slit coater and decompressed to expand air in the concaves. Residual water in the polyurethane layer was evaporated, and the layer was fully dried to be cured under the decompression condition. When the degree of decompressing vacuum was less than 1 kPa, a wall above the cell was opened, resulting in a honeycomb-structured sheet with an opening on both sides. When polyurethane was used as a deformable material, a honeycomb-structured sheet I was produced with a thickness of a partition between cells being 1 to 10 μm, a thickness of upper and lower walls being 1 to 10 μm, and a curvature radius of the intersecting area of the partition with either wall being 5 to 50 μm.

Example 2

Manufacture of a Honeycomb-Structured Sheet II

Gelatin which is a water soluble resin was used as a deformable covering material. For gelatin, MC-243 (produced by Jellice Co. Ltd.) was used. Gelatin was dissolved in water at 5-30 wt %. A gelatin layer was formed on the substrate 20 as shown in FIG. 6A, for example, using a slit coater and decompressed to expand air in the concaves. Residual water in the gelatin layer was evaporated, and the layer was fully dried to be cured under the decompression condition. The concentration of gelatin and the degree of decompressing vacuum determined whether an upper wall was opened or not. When the concentration of gelatin was low, the upper wall was opened even with a low decompressing vacuum. When the concentration of gelatin was high, the upper wall was not opened with a low decompressing vacuum. When gelatin was used as a deformable material, a honeycomb-structured sheet II was produced with a thickness of a partition between cells being 0.01 to 5 μm, a thickness of upper and lower walls being 0.01 to 2 μm, and a curvature radius of the intersecting area of the partition with either wall being 0.1-20 μm.

Example 3

Manufacture of a Honeycomb-Structured Sheet III

Polyvinyl alcohol which is a water soluble resin was used as a deformable covering material. For polyvinyl alcohol, POVAL PVA117 (produced by Kuraray CO., Ltd.) was used. Polyvinyl alcohol was dissolved in water at 5-30 wt %. A polyvinyl alcohol layer was formed on the substrate 20 as shown in FIG. 6A, for example, using a slit coater and decompressed to expand air in the concaves. Residual water in the polyvinyl alcohol layer was evaporated, and the layer was fully dried to be cured under the decompression condition. The concentration of polyvinyl alcohol and the degree of decompressing vacuum determined whether an upper wall was opened or not. When the concentration of polyvinyl alcohol was low, an upper wall was opened even with a low decompressing vacuum. When the concentration of polyvinyl alcohol was high, an upper wall was not opened with a low decompressing vacuum. When polyvinyl alcohol was used as a plastic deformable material, a honeycomb-structured sheet III was produced with a thickness of a partition between cells being 3 to 10 µm, a thickness of upper and lower walls being 1 to 10 µm, and a curvature radius of the intersecting area of the partition with either wall being 10 to 50 µm.

Example 4

Manufacture of a Honeycomb-Structured Sheet IV

Alkoxy acrylate which is a UV curable resin was used as a deformable covering material. For alkoxy acrylate, PEG400DA (produced by Daicel-Cytec Company LTD.) was used. By adding Novec FC-4430 (produced by 3M), a fluorine-based surface active agent, to alkoxy acrylate, a surface tension of alkoxy acrylate was decreased and alkoxy acrylate became deformable. An alkoxy acrylate layer was formed on the substrate 20 as shown in FIG. 6A, for example, using a slit coater and decompressed to expand air in the concaves. When the degree of decompressing vacuum reached to 50 kPa, an ultraviolet was irradiated to cure the alkoxy acrylate layer. When alkoxy acrylate was used as a plastic deformable material, a honeycomb-structured sheet IV was produced with a thickness of a partition between cells being 0.01 to 3 µm, a thickness of upper and lower walls being 0.01 to 1 µm, and a curvature radius of the intersecting area of the partition with either wall being 0.01 to 5 µm.

Example 5

Manufacture of a Honeycomb-Structured Sheet V

Epoxy acrylate which is a UV curable resin was used as a deformable covering material. For epoxy acrylate, AQ9 (produced by Arakawa Chemical Industries, Ltd.) was used. By adding Novec FC-4430 (produced by 3M), a fluorine-based surface active agent, to epoxy acrylate, a surface tension of epoxy acrylate was decreased and epoxy acrylate became deformable. An epoxy acrylate layer was formed on the substrate 20 as shown in FIG. 6A, for example, using a slit coater and decompressed to expand air in the concaves. When the degree of decompressing vacuum reached to 50 kPa, an ultraviolet was irradiated to cure the epoxy acrylate layer. When epoxy acrylate was used as a plastic deformable material, a honeycomb-structured sheet V was produced with a thickness of a partition between cells being 0.01 to 5 µm, a thickness of upper and lower walls being 0.01 to 1 µm, and a curvature radius of the intersecting area of the partition with either wall being 0.1 to 5 µm.

Example 6

Manufacture of a Display Panel I and a Display Unit I

A display panel and a display unit as shown in FIG. 3 were produced. A honeycomb-structured sheet I produced in Example 1, was used, which was in a hexagonal closest-packing and had an opening on one side. The honeycomb-structured sheet I was used, with a thickness of a partition between cells being about 2 µm, a thickness of upper and lower walls being about 1 µm, and a curvature radius of the intersecting area of the partition with either wall being about 5 µm. A lower wall (or an upper wall) of each cell was adhered to a PET film with an ITO layer attached to by an adhesive layer. For adhesion, UV curable adhesives or epoxy-based adhesives can be used. As shown in FIG. 12, after the honeycomb-structured sheet I was adhered to the PET film 29, the sheet was separated from the substrate 20. An electrophoretic solution 30 was infused in each cell 25, and then the opening 1226 was sealed. For a sealing material 36, a water soluble resin which does not blend into the electrophoretic solution was used. Polyurethane, gelatin, or polyvinyl alcohol can be used as the water soluble resin. A layer of one of these water soluble resins was formed on the electrophoretic solution using a slit coater, and then the layer was dried to seal the solution, resulting in a display panel I. A thickness of the sealing layer was about 5 µm. This sealing layer was adhered to a voltage driver circuit by an adhesive layer, resulting in a display unit I. For adhesion, UV curable adhesives or epoxy-based adhesives can be used. The thinner the sealing layer is, the less drop in a voltage was caused, thereby being able to drive the unit with a low voltage.

In this display unit I, a display quality of white reflectance 38%, black reflectance 1%, and contrast 38 was obtained. By way of comparison, when the same electrophoretic solution was infused in a cell with a depth of 50 µm and a length and width of 10 mm, a display quality of white reflectance 43%, black reflectance 1%, and contrast 43 was obtained.

Example 7

Manufacture of a Display Unit II

A structure of a display unit was illustrated in FIG. 3. A honeycomb-structured sheet II produced in Example 2, was used, which was in hexagonal closest and had an opening on one side. The honeycomb-structured sheet was used, with a thickness of a partition between cells being about 2 µm, a thickness of upper and lower walls being about 1 µm, and a curvature radius of the intersecting area of the partition with either wall being about 5 µm. A lower wall (or an upper wall) of each cell was adhered to a voltage driver circuit by an adhesive layer. For adhesion, UV curable adhesives or epoxy-based adhesives can be used. After the honeycomb-structured sheet II was adhered to the voltage driver circuit, the sheet was separated from the substrate 20. An electrophoretic solution was infused in each cell, and then the opening was sealed. For sealing, a water soluble resin which does not blend into the electrophoretic solution was used. Polyurethane, gelatin, or polyvinyl alcohol can be used as the water soluble resin. A layer of one of these water soluble resins was formed on the electrophoretic solution using a slit coater, and then the layer was dried to seal the solution. A thickness of this sealing layer was about 5 µm. This sealing layer was adhered to a PET film with an ITO layer attached to by an adhesive layer, resulting in a display unit II. For adhesion, UV curable adhesives or epoxy-based adhesives can be used. The thinner the sealing layer is, the better display quality can be obtained, thereby being able to increase a reflectance.

In the display unit II, a display quality of white reflectance 38%, black reflectance 1%, and contrast 38 was obtained. By way of comparison, when the same electrophoretic solution was infused in a cell with a depth of 50 µm and a length and width of 10 mm, a display quality of white reflectance 43%, black reflectance 1%, and contrast 43 was obtained.

Example 8

Manufacture of a Display Unit III

A structure of a display unit was illustrated in FIG. 3. A honeycomb-structured sheet III produced in Example 3, was used, which was in a hexagonal closest-packing and had an opening on both surfaces. The honeycomb-structured sheet was used, with a thickness of a partition between cells being about 2 μm, a thickness of upper and lower walls being about 1 μm, and a curvature radius of the intersecting area of the partition with either wall being about 5 μm. An upper wall with an opening at the top of each cell was adhered to a voltage driver circuit by an adhesive layer. For adhesion, UV curable adhesives or epoxy-based adhesives can be used. After the honeycomb-structured sheet III was adhered to the voltage driver circuit, the sheet was separated from the substrate. An electrophoretic solution was infused in each cell, and then the opening was sealed. For sealing, a water soluble resin which does not blend into the electrophoretic solution was used. Polyurethane, gelatin, or polyvinyl alcohol can be used as the water soluble resin. A layer of one of these water soluble resins was formed on the electrophoretic solution using a slit coater, and then the layer was dried to seal the solution. A thickness of this sealing layer was about 5 μm. This sealing layer was adhered to a PET film with an ITO layer attached to by an adhesive layer, resulting in a display unit III. For adhesion, UV curable adhesives or epoxy-based adhesives can be used. The thinner the sealing layer is, the better display quality can be obtained, thereby being able to increase a reflectance.

In the display unit III, a display quality of white reflectance 40%, black reflectance 1%, and contrast 40 was obtained. By way of comparison, when the same electrophoretic solution was infused in a cell with a depth of 50 μm and a length and width of 10 mm, a display quality of white reflectance 43%, black reflectance 1%, and contrast 43 was obtained.

Example 9

Manufacture of a Display Unit IV

A structure of a display unit was illustrated in FIG. 3. A honeycomb-structured sheet IV produced in Example 4, was used, which was in a hexagonal closest-packing and had an opening on both surfaces. The honeycomb-structured sheet was used, with a thickness of a partition between cells being about 2 μm, a thickness of upper and lower walls being about 1 μm, and a curvature radius of the intersecting area of the partition with either wall being about 5 μm. A lower wall (or an upper wall) of each cell was adhered to a PET film with an ITO layer attached to by an adhesive layer. For adhesion, UV curable adhesives or epoxy-based adhesives can be used. After the honeycomb-structured sheet was adhered to the PET film, the sheet was separated from the substrate. An electrophoretic solution was infused in each cell, and then the opening was sealed. For sealing, a water soluble resin which does not blend into the electrophoretic solution was used. Polyurethane, gelatin, or polyvinyl alcohol can be used as the water soluble resin. A layer of one of these water soluble resins was formed on the electrophoretic solution using a slit coater, and then the layer was dried to seal the solution. A thickness of this sealing layer was about 5 μm. This sealing layer was adhered to a voltage driver circuit by an adhesive layer, resulting in a display unit IV. For adhesion, UV curable adhesives or epoxy-based adhesives can be used. The thinner the sealing layer is, the less drop in a voltage was caused, thereby being able to drive the unit with a low voltage.

In this display unit IV, a display quality of white reflectance 41%, black reflectance 1%, and contrast 41 was obtained. By way of comparison, when the same electrophoretic solution was infused in a cell with a depth of 50 μm and a length and width of 10 mm, a display quality of white reflectance 43%, black reflectance 1%, and contrast 43 was obtained.

The white reflectance of the display unit I to IV produced in Examples 6 to 9 and the ratio thereof to the white reflectance of the corresponding comparison sample are shown in Table 1.

TABLE 1

|  | Example 6 | Example 7 | Example 8 | Example 9 |
| --- | --- | --- | --- | --- |
| White Reflectance | 38% | 38% | 40% | 41% |
| Ratio to Comparison Sample | 0.88 | 0.88 | 0.93 | 0.95 |

A pitch between cells in the hexagonal closest-packing according to the present invention was 150 μm. Since a thickness of a partition between cells was 2 μm, 0.97 for an opening ratio of the cell was calculated. In Example 6 to 9, an upper wall, sealing layer, and adhesive layer were placed on the opening on the cell, which slightly decrease the reflectance. In Example 9, only a thickness of the adhesive layer is increased compared to the comparison sample, resulting in the slightest decrease in the reflectance.

The present application is based on Japanese priority application No. 2007-059118 filed on Mar. 8, 2007, with the Japanese Patent Office, the entire contents of which are hereby incorporated by reference.

What is claimed is:

1. A display panel comprising:
 a sheet including:
  first and second sheet surfaces that are spaced apart from each other and define a space therebetween; and
  a plurality of partitions extending from the first sheet surface to the second sheet surface and dividing the space between the first sheet surface and the second sheet surface into a plurality of cells, wherein
 the thickness of each partition is in a range of 0.01 to 10 μm, and
 the sheet further includes a plurality of first walls defined by the first sheet surface and corresponding to the respective cells, the first walls each having a thickness in a range of 0.01 to 10 μm,
 wherein the partitions and the first walls are formed of same material, and
 wherein the partitions and the first walls form intersecting areas having a curved surface of 0.1 to 50 μm in a curvature radius.

2. The display panel as claimed in claim 1, wherein the partitions are made of a water soluble resin or a resin cured by ultraviolet irradiation.

3. The display panel as claimed in claim 1, wherein the first walls are made of a resin of which a thickness is in a range of 0.1 to 1.0 μm.

4. The display panel as claimed in claim 1, wherein the first and second surfaces are formed of a resin which has a thickness in a range of 0.1 to 10 μm.

5. The display panel as claimed in claim 1, wherein the sheet comprising said cells is a sheet having a honeycomb structure.

6. The display panel as claimed in claim 1, wherein said plurality of cells between the first and second sheet surfaces form a honeycomb structure.

7. A display unit, comprising:
 a display panel comprising a sheet including:
  first and second sheet surfaces that are spaced apart from each other and define a space therebetween; and a plurality of partitions extending from the first sheet surface to the second sheet surface and dividing the space between the first sheet surface and the second sheet surface into a plurality of cells, wherein the thickness of each partition is in a range of 0.01 to 10 μm, and the sheet further includes a plurality of first walls defined by the first sheet surface and corresponding to the respective cells, the first walls each having a thickness in a range of 0.01 to 10 μm, and wherein the partitions and the first walls are formed of same material, electrodes that apply a voltage to the first and second surfaces of the display panel, and wherein the partitions and the first walls form intersecting areas having a curved surface of 0.1 to 50 μm in a curvature radius.

8. The display unit as claimed in claim 7, wherein at least one of said electrodes is a transparent electrode.

9. The display unit as claimed in claim 7, wherein the partitions and the first walls are made of a water soluble resin or a resin cured by ultraviolet irradiation.

10. The display unit as claimed in claim 7, wherein the partitions and the first walls are made of a resin and each of the partitions and the first walls has a thickness in a range of 0.1 to 10 μm.

11. The display unit as claimed in claim 7, wherein the first and second surfaces are formed of a resin which has a thickness in a range of 0.1 to 10 μm.

12. The display unit as claimed in claim 7, wherein said plurality of cells between the first and second sheet surfaces form a honeycomb structure.

13. Electronic equipment for image display, wherein the electronic equipment includes one of an electronic paper, an electronic book, an electronic notebook, an electronic schedule display, an electronic advertising display board, a mimic board, and an electronic map display, said electronic equipment for image display comprising a display unit that includes:

a display panel comprising a sheet including:

first and second sheet surfaces that are spaced apart from each other and define a space therebetween; and a plurality of partitions extending from the first sheet surface to the second sheet surface and dividing the space between the first sheet surface and the second sheet surface into a plurality of cells, wherein the thickness of each partition is in a range of 0.01 to 10 μm, and the sheet further includes a plurality of first walls defined by the first sheet surface and corresponding to the respective cells, the first walls each having a thickness in a range of 0.01 to 10 μm, and the partitions and the first walls are formed of same material; and the display unit further including electrodes that apply a voltage to the first and second surfaces of the display panel, and wherein the partitions and the first walls form intersecting areas having a curved surface of 0.1 to 50 μm in a curvature radius.

14. The electronic equipment as claimed in claim 13, wherein the partitions and the first walls are made of a water soluble resin or a resin cured by ultraviolet irradiation.

15. The electronic equipment as claimed in claim 13, wherein the first walls are made of a resin, and each of the partitions and the first walls has a thickness in a range of 0.1 to 10 μm.

16. The electronic equipment as claimed in claim 13, wherein the first and second surfaces are formed of a resin which has a thickness in a range of 0.1 to 10 μm.

17. The electronic equipment as claimed in claim 13, wherein said plurality of cells between the first and second sheet surfaces form a honeycomb structure.

* * * * *